(12) United States Patent
Kloft et al.

(10) Patent No.: US 12,142,900 B2
(45) Date of Patent: Nov. 12, 2024

(54) CABLE TRAY SYSTEM

(71) Applicant: Niedax GmbH & Co. KG, Linz am Rhein (DE)

(72) Inventors: Martin Kloft, Linz am Rhein (DE); Andreas Tipmann, Linz am Rhein (DE)

(73) Assignee: NIEDAX GMBH & CO. KG, Linz am Rhein (DE)

( * ) Notice: Subject to any disclaimer, the term of this patent is extended or adjusted under 35 U.S.C. 154(b) by 199 days.

(21) Appl. No.: 17/760,406

(22) PCT Filed: Feb. 9, 2021

(86) PCT No.: PCT/EP2021/053022
§ 371 (c)(1),
(2) Date: Aug. 9, 2022

(87) PCT Pub. No.: WO2021/160581
PCT Pub. Date: Aug. 19, 2021

(65) Prior Publication Data
US 2023/0078478 A1   Mar. 16, 2023

(30) Foreign Application Priority Data

Feb. 10, 2020   (DE) .................... 10 2020 103 309.5

(51) Int. Cl.
*H02G 3/06*   (2006.01)
*H02G 3/04*   (2006.01)

(52) U.S. Cl.
CPC ......... *H02G 3/0608* (2013.01); *H02G 3/0437* (2013.01)

(58) Field of Classification Search
None
See application file for complete search history.

(56) References Cited

U.S. PATENT DOCUMENTS 3,119,472 A * 1/1964 McLeod .................. F16B 2/02
411/389
2018/0231038 A1* 8/2018 Shelton ............... H02G 3/0608

FOREIGN PATENT DOCUMENTS

DE        19841643 A1    3/2000
DE    202008009852 U1    9/2008
(Continued)

OTHER PUBLICATIONS

International Searching Authority. International Search Report for PCT Application No. PCT/EP2021/053022 and English Translation, mailed May 14, 2021, pp. 1-5.

*Primary Examiner* — Krystal Robinson
(74) *Attorney, Agent, or Firm* — Vivacqua Crane, PLLC

(57) ABSTRACT

A cable tray system has two or more cable tray segments, the cable tray segments each having a cable tray underside and two cable tray side cheeks which laterally delimit the cable tray underside and form a substantially U-shaped cross section. A connecting section is provided at one end of one cable tray segment and one end of another cable tray segment can be connected in or on this connecting section with complementary mechanical connecting elements by means of a clamping or latching connection. When two corresponding ends of the cable tray segments are plugged together in the longitudinal direction of the cable tray segments and also in the vertical direction of the cable tray segments, the ends are resiliently bent towards each other until a desired connection position is reached and form a snap-in connection that locks in the longitudinal and vertical directions.

17 Claims, 7 Drawing Sheets

(56) References Cited

FOREIGN PATENT DOCUMENTS

| | | | |
|---|---|---|---|
| DE | 202009004970 U1 * | 12/2010 | ........... H02G 3/0437 |
| EP | 1675231 A2 * | 6/2006 | ........... H02G 3/0418 |
| ES | 2354556 A1 | 3/2011 | |
| RU | 187594 U1 | 3/2019 | |
| WO | WO-2013015755 A2 * | 1/2013 | ........... H02G 3/0437 |
| WO | 2015053643 A2 | 4/2015 | |

* cited by examiner

CABLE TRAY SYSTEM

CROSS-REFERENCE TO RELATED APPLICATIONS

This application is a national stage filing under 35 U.S.C. § 371 of international application No. PCT/EP2021/053022, filed Feb. 9, 2021, which claims priority to German patent application No. 102020103309.5, filed Feb. 10, 2020. The contents of these applications are incorporated herein by reference in their entirety.

INTRODUCTION

The invention relates to a cable tray system with two or more cable tray segments according to the generic term of claim 1. In particular, the invention relates to a cable tray system with two or more cable tray segments, wherein the cable tray segments each have a cable tray underside and two cable tray side cheeks laterally delimiting the cable tray underside, which form a substantially U-shaped cross-section. The cable tray segments are thereby arranged such that two cable tray segments can be connected to one another in an overlapping manner and, for this purpose, a connecting section is provided at one end of one cable tray segment and one end of another cable tray segment can be connected in or on this connecting section by complementary mechanical connecting elements by means of a clamping or latching connection. The cable tray segments are preferably made of sheet metal.

Cable tray systems of the type described are known from the state of the art and are used to support and guide cables and wires. Depending on the application, the cable tray systems are composed of straight, curved and/or ramp-shaped cable tray segments. In the known systems, the individual cable tray segments are usually bolted together and/or connected to each other by retaining clips that grip behind guides.

Usually, a distinction is made between two types of cable tray systems. On the one hand, those in which the cable tray segments are constructed from wire mesh and, on the other hand, those which are made of sheet metal. Usually, a metal, especially steel, is used as the material. The cable tray segments are then, depending on their intended use, additionally hot-dip galvanized or powder-coated for corrosion protection reasons. In particular, the present invention relates to cable tray segments made of perforated sheet metal.

One disadvantage of the previous cable tray systems is that it is difficult to thread two cable tray segments into each other. This is particularly the case with wider cable tray segments in conjunction with high mounting locations.

In addition, irregularities can occur at the edges during hot-dip galvanizing, so that it can happen that individual eyelets and openings of the cable tray segments are clogged by the zinc material.

The different coatings for corrosion protection are preferably applied to the same base material, and the same tools are also used for this purpose. The additional coating leads to a thickening of the wall thickness of the cable tray segments. This can then lead to gaps and undergrips becoming too narrow. As a result, the individual cable tray segments can only be installed with difficulty.

It is therefore the task of the invention to provide an improved cable tray system that overcomes at least one of the above-mentioned disadvantages. In particular, it is the task of the invention to provide a simple, inexpensive and ergonomically mountable cable tray system.

SUMMARY

According to the invention, the problem is solved by a cable tray system having the features of claim 1. Preferred embodiments of the invention are given in the subclaims and the following description, each of which may individually or in combination constitute an aspect of the invention.

According to the invention, the complementary mechanical connecting elements are set up, when two corresponding ends of the cable tray segments are plugged together in the longitudinal direction of the cable tray segments and also in the vertical direction of the cable tray segments, to resiliently bend the ends towards each other until a desired connecting position is reached and to form a latching connection in the longitudinal and vertical direction in the desired connecting position. Assembly can be carried out without tools or screws.

The complementary connecting elements are preferably arranged on the cable tray side cheeks and formed from latching elements and corresponding mating receptacles. At least two latching elements per cable tray side cheek are provided at one end of a cable tray segment and two corresponding mating receptacles are provided at the end of the other cable tray segment to be connected. The latching elements are preferably provided in the connecting section of the cable tray segment, which is designed as an offset section. The mating receptacles are advantageously designed as latching holes in the cable tray side cheeks.

In order to resiliently bend the ends in the longitudinal direction and vertical direction of the cable tray segments when two corresponding ends of the cable tray segments are plugged together until a desired connecting position is reached, the latching elements can each have a ramp-shaped part. The end of the cable tray segment with the mating receptacles is guided over the latching elements by the ramp-shaped parts.

One advantage of the new design is that cable tray segments can now be assembled both horizontally and vertically. In addition, it is now possible to replace the cable tray segments at a later date, whereas previously a cable tray segment had to be sawn up in order to be able to pull it off the neighboring cable tray segments.

In an advantageous embodiment of the invention, at least one of the latching elements is arranged in each case in such a way that the ramp-shaped part points in the longitudinal direction in the direction of the end of the cable tray segment and another latching element has a ramp-shaped part which points vertically transversely with respect to the longitudinal direction in the direction of the upper edge of the cable tray side cheek. The latching elements are each arranged in such a way that the ramp-shaped parts of the latching elements of one cable tray segment first come into contact with the end of the other cable tray segment when the ends of two corresponding cable tray segments are plugged together, in order to achieve the resilient bending.

The arrangement and alignment of the latching elements enable particularly simple and clamp-free assembly of the cable tray segments. Unintentional catching of one end of the cable tray segment on one of the latching parts of the latching elements is thus avoided.

With regard to the manufacture of the cable tray segments and their assembly, the latching elements are formed in a particularly advantageous manner by strap-shaped latching elements arranged in the cable tray segments. The strap-shaped latching elements thus have two ramp-shaped parts pointing in opposite directions. As latching flanks, the side flanks of the straps form the latching or engaging part of the latching elements in the corresponding latching holes. Preferably, the strap-shaped latching elements are stamped into the sheet metal.

Preferably, the latching elements of a cable tray segment have a nearest distance to the end of the cable tray segment of 10-15 mm.

The at least two latching elements on the cable tray side cheek can also be arranged in such a way that the ramp-shaped parts of the latching elements are angled towards each other. It has proved advantageous to select an angle of ±35-55°, in particular ±45°, from the vertical. Viewed from the cable tray side, the angled latching elements can be V-shaped or inverted V-shaped. The ramp-shaped parts thus result in easy mounting in the vertical direction.

The preferably strap-shaped latching elements are provided at the same height on the cable tray side cheeks.

Particularly in the case of larger cable tray widths, connecting tabs, in particular bending tabs, can be provided on the underside of the cable tray and/or the cable tray side cheeks as an additional fastening measure for two cable tray segments on one of the cable tray segments. When the cable tray segments are inserted into one another, the connecting tabs are bent over with the aid of tools and engage in corresponding openings in the other cable tray segment. This achieves an additional form fit of the connected cable tray segments.

The offset connecting section at the end of one cable tray segment may be formed so that the end is flared and an unoffset end of the other cable tray segment is insertable into the offset for the intended assembly of the two cable tray segments.

In an advantageous embodiment, a downwardly angled ramp is provided at one end of a cable tray segment on the underside of the cable tray, particularly preferably at the end of the cable tray segment with the offset connecting section.

This facilitates the assembly of two corresponding cable tray segments. Compared to a flat lower edge of the bend, this has the advantage that if the cable tray segment to be inserted into the bend curves or bends, it can still be pushed into one another.

Preferably, the end of the other cable tray segment corresponding to the cable tray segment with ramp has one or more latching elements arranged horizontally transversely to the longitudinal direction of the cable tray segment, and the cable tray segment with ramp has matching latching holes. The latching elements are arranged to form a longitudinally latching connection when the cable tray segments are connected. In particular, the latching elements can be straps arranged in the sheet horizontally transverse to the longitudinal direction.

Particularly preferably, the width of the ramp of the cable tray segment is dimensioned such that the latching elements of the corresponding end of the other cable tray segment, which are arranged on the underside of the cable tray, are located within the ramp area when the two cable tray segments are assembled as intended.

In order to improve the modularity of the cable tray system according to the invention, the cable tray system may also have cable tray segments with cable tray side cheeks of different heights, wherein the cable tray segments of different heights each have, on the cable tray side cheek, equally spaced from the cable tray underside, latching elements and/or latching holes as described above.

In this way, cable tray segments of different heights can thus be combined with each other. For example, a 60 mm high cable tray segment can be connected (married) with an 85 mm cable tray segment or a 110 mm high cable tray segment.

In the transition area from the offset connection area to the unoffset part of a cable tray segment, a recess is provided between the side wall of the cable tray and the underside of the cable tray. This is designed to receive or carry away material removed by pushing the cable tray segments together.

The cable tray segments are preferably made of sheet metal with a wall thickness of approx. 0.5 mm to approx. 2 mm. The sheets can be flat or have indentations.

In another aspect of the invention, a cable tray segment is provided for use in the cable tray system described above, wherein the cable tray segment may also be configured in accordance with the above embodiments. In particular, it may preferably be provided that the ends of the cable tray segment are configured such that one end of the cable tray segment forms a corresponding end to the other end of the cable tray system.

Further features and advantages of the invention will be apparent from the following description of preferred embodiments based on the drawings.

BRIEF DESCRIPTION OF THE DRAWINGS

The drawings described herein are for illustration purposes only and are not intended to limit the scope of the present disclosure in any way.

FIG. 5: an assembly of two cable tray segments by swiveling them in.

DETAILED DESCRIPTION

FIGS. 1 to 7 show a possible embodiment of the cable tray system 1 according to the invention. The cable tray system 1 comprises two or more cable tray segments 2, 3 which are inserted into one another in an overlapping manner to form a cable duct for accommodating lines and cables in a connecting section.

In the embodiment shown, the cable tray segments 2, 3 of the cable tray system 1 are formed from a bent sheet metal part and have a cable tray underside and two cable tray side cheeks laterally delimiting the cable tray underside. Two cable tray segments 2, 3 are fastened via an overlapping connection area by means of complementary mechanical connecting elements in the form of a clamp or latching connection.

Figure 1:
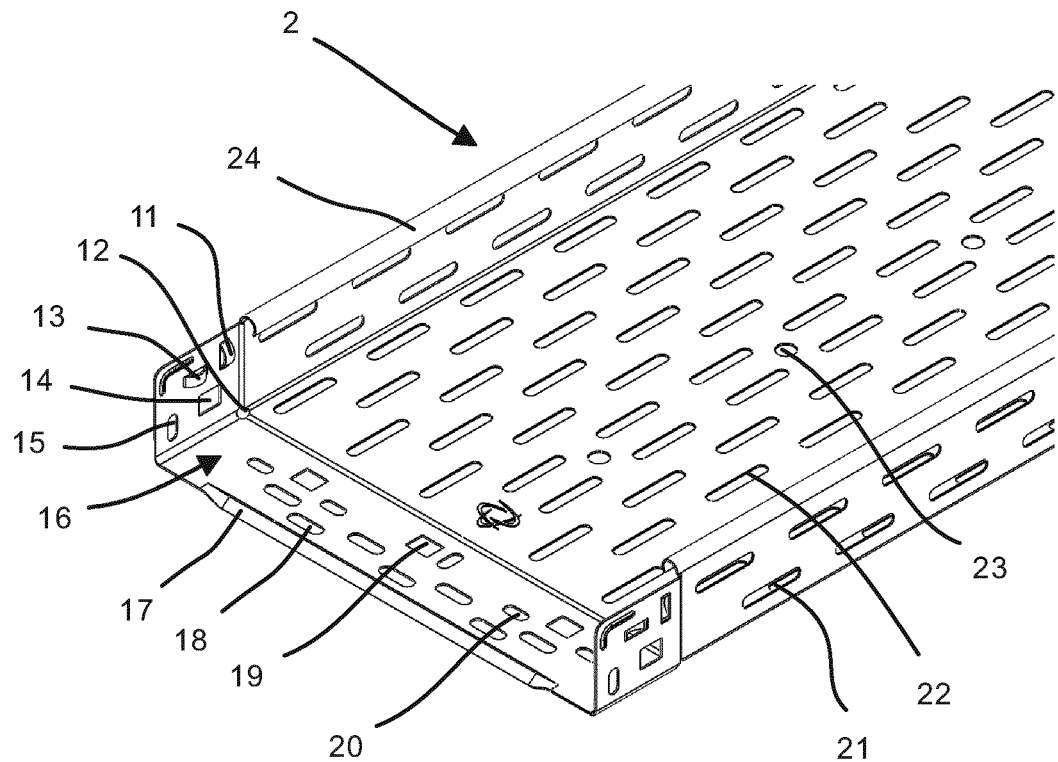
FIG. 1: an end of a first cable tray segment of the cable tray system in a perspective view.

The end of the first cable tray segment 2 shown in FIG. 1 is offset in a first connecting section. The offset is represented by a flared end of the cable tray segment 2. The offset connecting section is widened by approximately the wall thickness of the cable tray segment 2, so that an unoffset end of a further cable tray segment 3 can be received therein and a substantially flush transition between the cable tray segments 2, 3 is achieved.

The complementary mechanical connecting elements are formed as strap-shaped latching elements 11, 13 embossed in the sheet metal and corresponding latching holes 29, 30. On each of the cable tray side cheeks of the cable tray segment 2 shown in FIG. 1, two strap-shaped latching elements 11, 13 are stamped into the sheet metal in the bend area pointing inwards, namely a vertically oriented side strap 11 and a horizontally oriented side strap 13. Due to the strap-shaped design, the latching elements 11, 13 have a ramp-shaped part on two opposite sides, over which a corresponding end of another cable tray segment 3 can be pushed in a resiliently bending manner.

The side flanks of the strap-shaped latching elements 11, 13 form retaining edges via which the interconnected cable tray segments 2, 3 are held positively when they engage in the corresponding latching holes 29, 30.

The horizontally oriented side strap 13 is positioned longitudinally in front of the vertically oriented side strap 11 when viewed from the end of the cable tray segment 2. The distance between the horizontally oriented side straps 13 and the end of the cable tray segment is preferably approx. 10-15 mm. In the embodiment shown, the strap-shaped latching elements 11, 13 are arranged in the upper half of the cable tray side cheeks, approximately in the region of the upper row of elongated holes.

In the lower area of the respective cable tray side cheek, a recess is also provided for a bending tab 14 as well as a vertical elongated hole which can function as a screw hole.

On the underside of the cable tray in the region of the bend, a downwardly angled ramp 17 is provided which extends symmetrically transversely from the longitudinal axis of the cable tray segment 2 almost to the cable tray side cheeks. Furthermore, on the underside of the cable tray there are a number of latching holes 18 for corresponding strap-shaped latching elements 28 of the corresponding end of a further cable tray segment 3 to be inserted into the bend. These extend horizontally transversely to the longitudinal direction of the underside of the cable tray.

The ramp 17 is dimensioned so wide that the latching elements 28 on the cable tray underside of the other cable tray segment 3 are gripped by the ramp 17 when the cable tray segments 2, 3 are assembled. In addition, the cable tray underside also has recesses for bending lugs 19 and transversely arranged screw holes 20.

Figure 2:
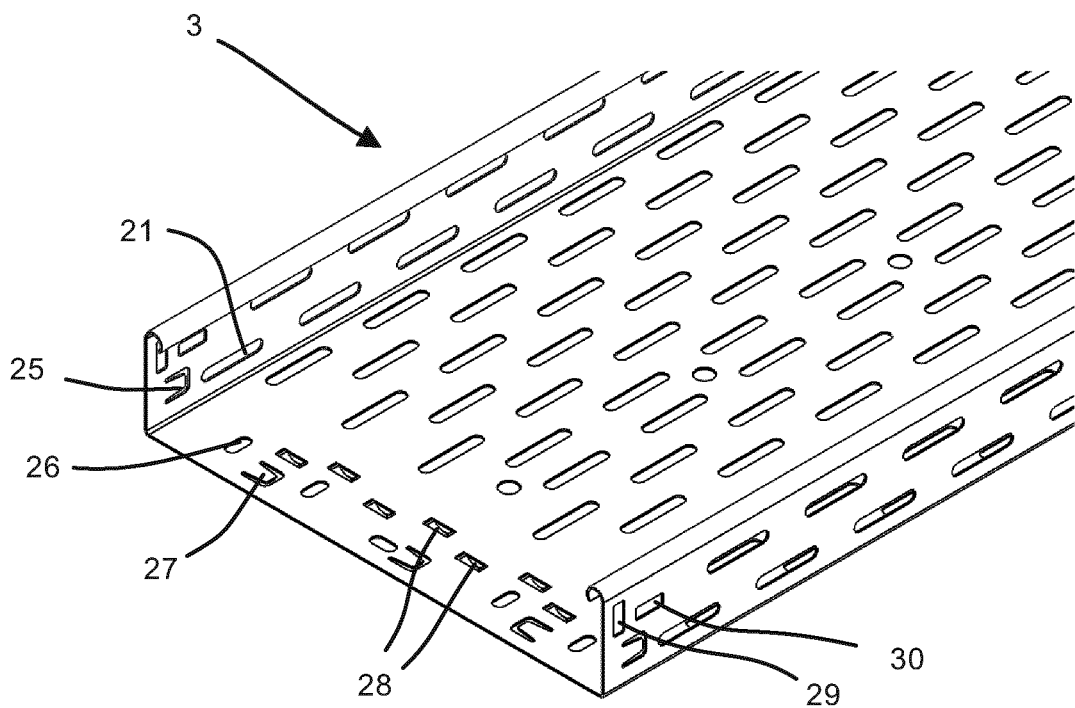
FIG. 2: an end of a second cable tray segment corresponding to the cable tray segment in FIG. 1, FIG. 3: an assembly process of two cable tray segments in longitudinal direction.

FIG. 2 shows an end of a second cable tray segment 3 corresponding to the cable tray segment 2 of FIG. 1. The end is unbent and has latching holes 29, 30 and latching elements 28 corresponding to the first cable tray segment 2 in a connecting section.

The latching holes 29, 30 corresponding to the latching elements 11, 13 of the first cable tray segment 2 are arranged accordingly in the upper half of the cable tray side cheeks. Viewed from the end of the cable tray segment 3, a vertical latching hole 29 is provided in front of a horizontal latching hole 30 on each cable tray side cheek.

The latching holes 29, 30 form a rectangular outline, the long side of the rectangular cross-section preferably being more than twice as long as the short side of the rectangle. Furthermore, the ground plan of the latching holes 18, 29, 30 is dimensioned larger than the ground plan of the corresponding latching elements 11, 13, 28, in order to allow a smooth insertion into each other.

On the lower half of the cable tray side cheeks below the latching holes 29, 30, a bending tab 25 is provided on each cable tray side cheek, which are arranged in the desired connecting position of the two cable tray segments 2, 3 corresponding to the recesses 14 in the first cable tray segment 2, and fit correspondingly into these recesses 14. Furthermore, in the lower half of each of the cable tray side cheeks, a part of an elongated hole of the perforated sheet extends into the connecting section in order to additionally fasten the cable tray segments 2, 3 by means of a screw connection with the corresponding screw hole 15.

On the underside of the cable tray, evenly distributed over the width, three fastening tabs 27 and screw holes 26 are provided, which are also formed to correspond to the counterparts of the end of the first cable tray segment 2. Furthermore, strap-shaped latching elements 28 arranged in two rows offset from each other are provided on the underside of the cable tray in the connecting section. These are arranged horizontally transversely to the longitudinal direction of the cable tray segment 3, as viewed from the end of the cable tray segment 3, pointing away from the bending tabs 27. The latching elements are stamped into the sheet metal of the underside of the cable tray, pointing downwards.

Corresponding screw holes are provided as an additional means of fastening the cable tray segments 2, 3 in the nominal connecting position. The screw holes are preferably arranged perpendicularly or at an angle to each other.

Figure 3:
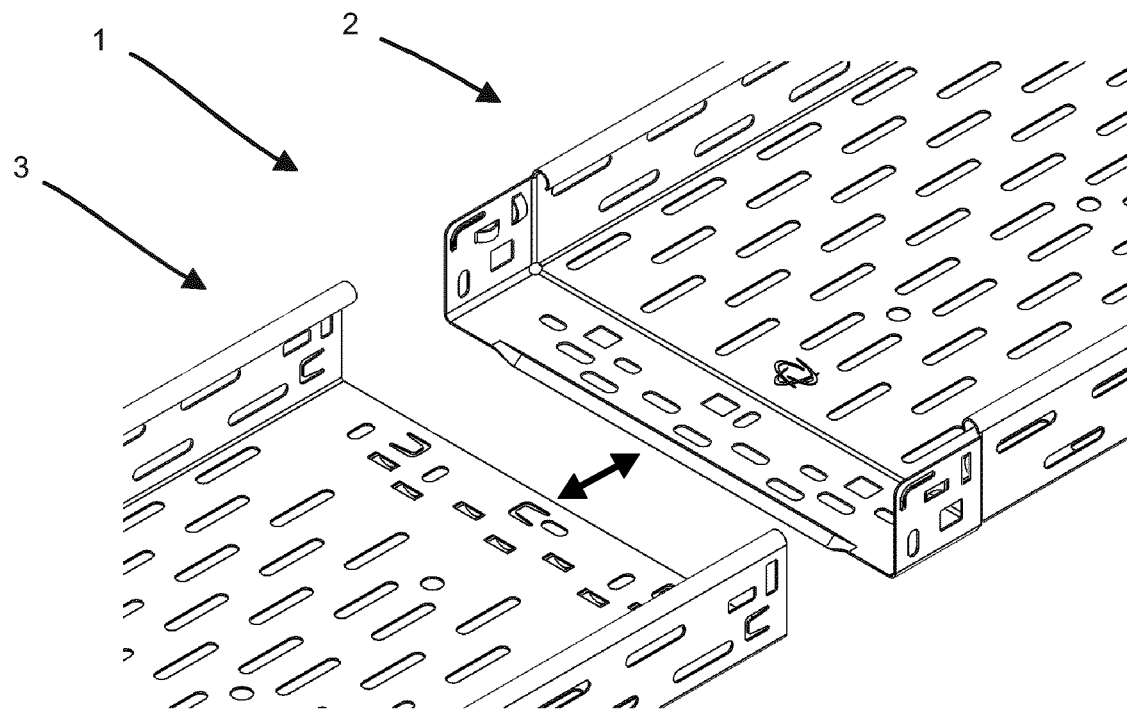
Figure 4:
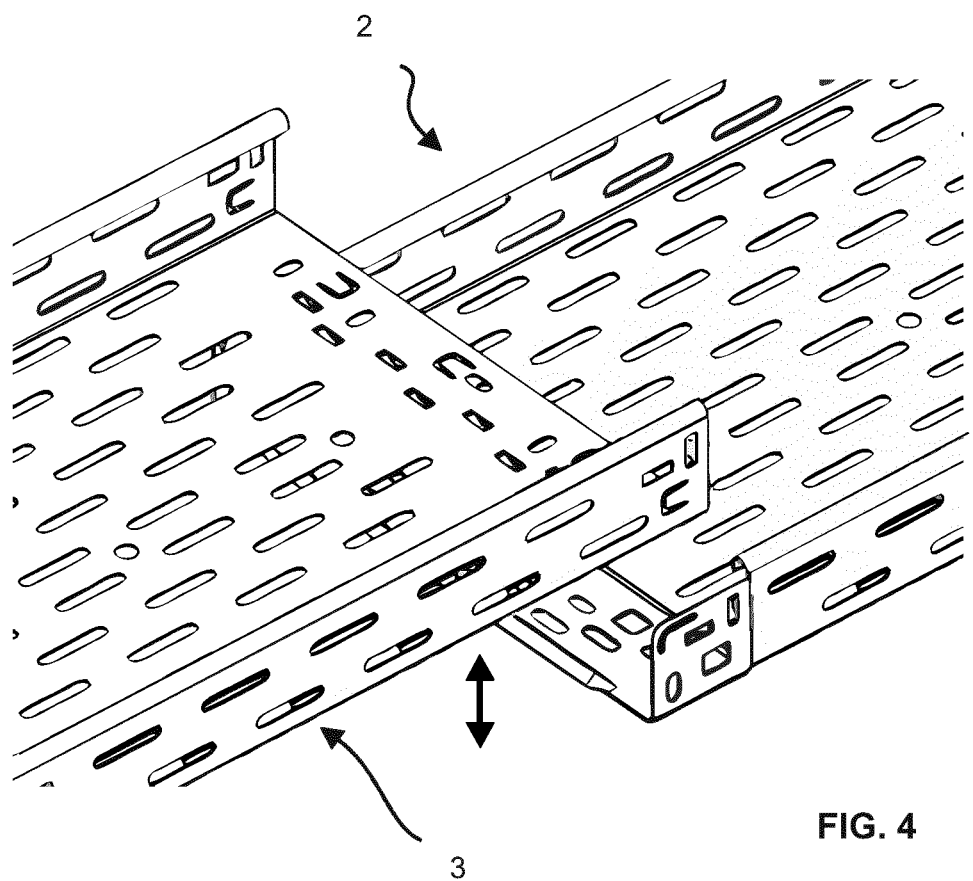
FIG. 4: an assembly process of two cable tray segments in vertical direction.
Figure 5:
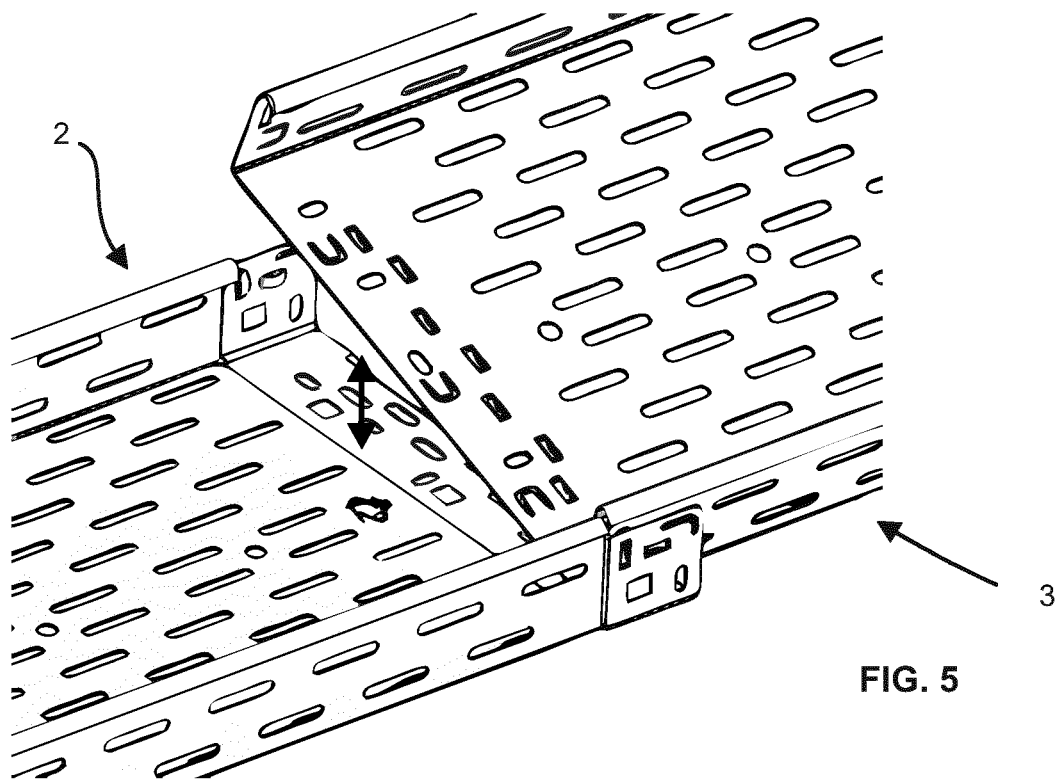

FIGS. 3 to 5 show different ways of connecting the cable tray segments 2, 3 described above. In the following, the cable tray segment with the end shown in FIG. 1 is referred to as the first cable tray segment 2 and the cable tray segment with the end shown in FIG. 2 is referred to as the second cable tray segment 3.

FIG. 3 shows a horizontal assembly of the cable tray segments 2, 3. For this purpose, the end of the second cable tray segment 3 is inserted into the offset section of the first cable tray segment 2. The cable tray side cheeks first come into contact with the horizontally oriented strap-shaped latching elements 13 of the first cable tray segment 2. The ramp-shaped part of the strap-shaped latching elements 13 elastically bends the cable tray side cheeks as they are pushed together further.

The arrangement of the horizontally oriented strap-shaped latching elements 13 relative to the vertically oriented strap-shaped latching elements 11 and the pitch and/or height of the latching elements are such that the end of the second cable tray segment 3 can be pushed over the latching elements 11, 13 into the desired connecting position without jamming against the vertically oriented strap-shaped latching elements. In the desired connecting position, the latching elements 11, 13 then form a longitudinally and vertically locking latching connection in conjunction with the latching holes.

The downwardly inclined ramp 17 in the bend area of the first cable tray segment 2 enables the second cable tray segment 3 to be pushed into the bend area of the first cable tray segment 2 by means of the latching elements 28 on the underside of the cable tray. As soon as the latching elements 28 come into contact with the ramp 17, the cable tray undersides of the cable tray segments 2, 3 are elastically bent against each other so that the second cable tray segment 3 can be advanced into the desired connecting position. In the desired connecting position, the latching elements 28 engage in the associated latching holes 18 and form a latching connection acting in the longitudinal direction.

A vertical assembly of the two cable tray segments 2, 3 is indicated in FIG. 4. Here, the end of the second cable tray segment 3 is inserted from above into the offset area of the first cable tray segment 2. In the process, the end of the second cable tray segment 3 first comes into contact with the vertically oriented strap-shaped latching elements 11 of the first cable tray segment 2. As a result, the cable tray side cheeks of the cable tray segments 2, 3 are elastically bent towards each other so that the end of the second cable tray segment 3 can be transferred via the latching elements 11, 13 to the desired connecting position. The pitch and/or height and/or arrangement of the vertically oriented latching elements 11 is set up in such a way that the second cable tray segment 3 can be connected to the first cable tray segment 2 without jamming against the horizontally oriented latching elements 13.

Similarly, the second cable tray segment 3 can also be inserted into the first cable tray segment 2 pivoted from above, as indicated in FIG. 5. The vertically oriented strap-shaped latching elements 11 again cause the cable tray side cheeks to bend open towards each other.

Figure 6:
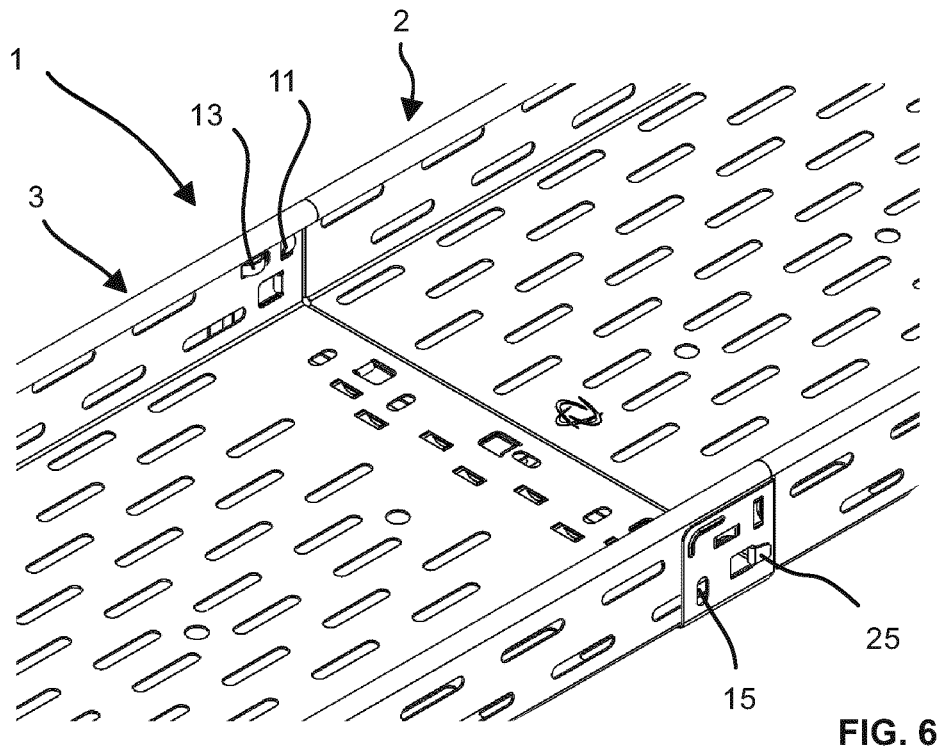
FIG. 6: two connected cable tray segments with bent fastening tabs in a perspective view from above.
Figure 7:
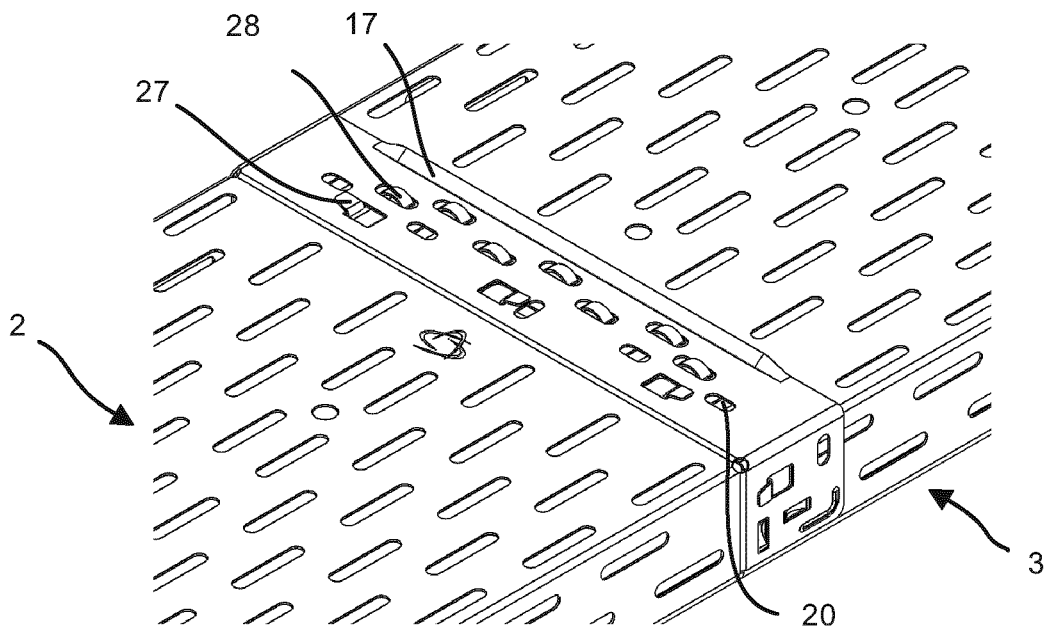
FIG. 7: two connected cable tray segments in a perspective view from below.

FIGS. 6 and 7 show the interconnected cable tray segments 2, 3 in the nominal connecting position in a perspective view from above (FIG. 6) and from obliquely below (FIG. 7). The latching elements 11, 13, 28 and the associated latching holes 29, 30, 18 are positioned relative to one another in such a way that a largely flush transition is achieved between the two cable tray segments 2, 3.

For additional fastening, the previously described fastening tabs 25, 27 of the second cable tray segment are bent over through the corresponding recesses 14, 19 both on the cable tray underside and on the cable tray side cheeks. In the embodiment shown, no additional screw connection of the cable tray segments 2, 3 to one another is shown, but this can be provided via the screw holes lying crossed over one another.

Figure 8:
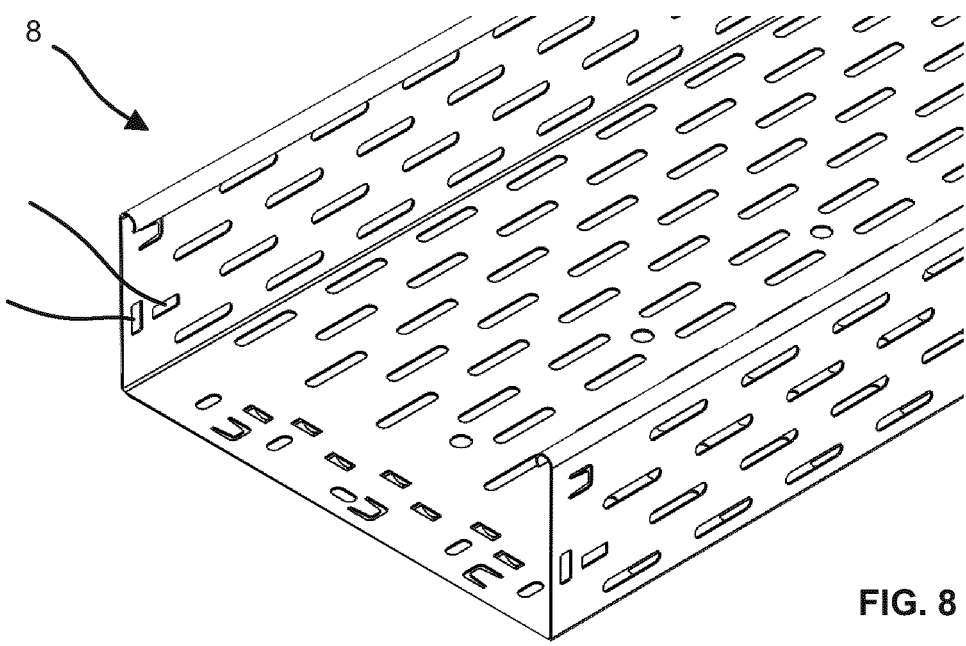
FIG. 8: one end of another cable tray segment with higher cable tray side cheeks.
Figure 9:
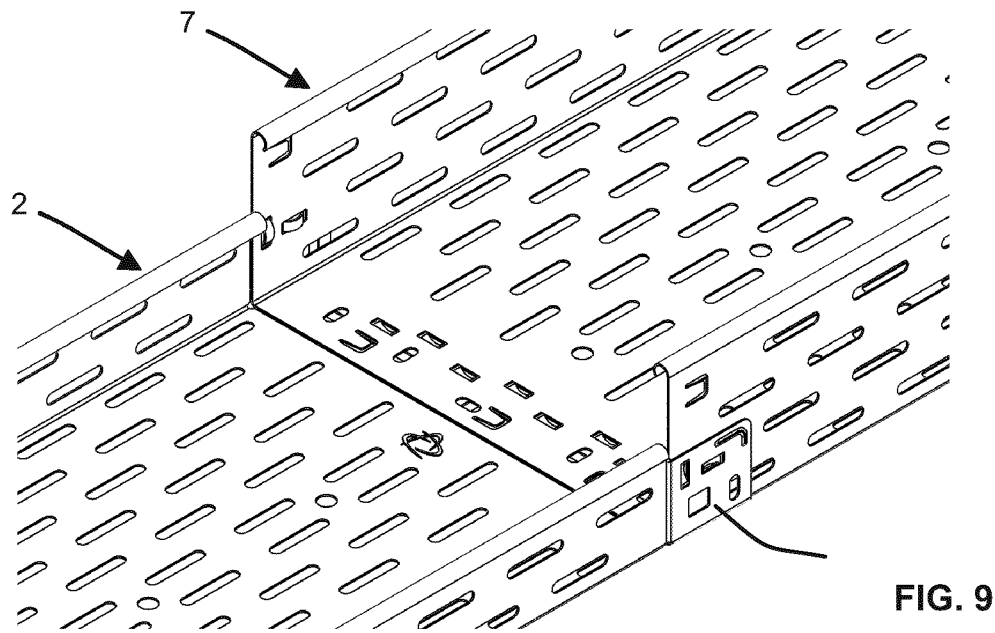
FIG. 9: an embodiment of two connected cable tray segments of different cable tray side cheek heights.

FIGS. 7 to 9 show further possible embodiments of the cable tray system 1, in which cable tray segments according to the invention with cable tray side walls 2, 8 of different heights are connected to each other. The cable tray segments 2, 8 have mechanical connecting elements formed on the cable tray side walls and on the cable tray undersides corresponding to one another, the connecting elements on the cable tray side walls of the first cable tray segment 2 being formed from horizontally oriented and vertically oriented strap-shaped latching elements 11, 13 and corresponding rectangular latching holes 29, 30 on the second cable tray segment. These each have an equal distance from the cable tray underside, so that cable tray segments with cable tray side cheeks of different heights can thus also be combined with one another. In the embodiments shown, cable tray segments of the width already described in the previous figures are shown, whereby the cable tray undersides in the connection area are also designed to match each other here.

As shown, both embodiments are possible in which the higher cable tray segment has an offset section into which the end of the less high cable tray segment is inserted, or vice versa. For such advantageous combinatorics, it is provided in accordance with the invention that latching elements 11, 13 provided on the cable tray side cheeks and the associated latching holes 29, 30 on the other cable tray segment are each equally spaced from the cable tray underside.

Figure 10:
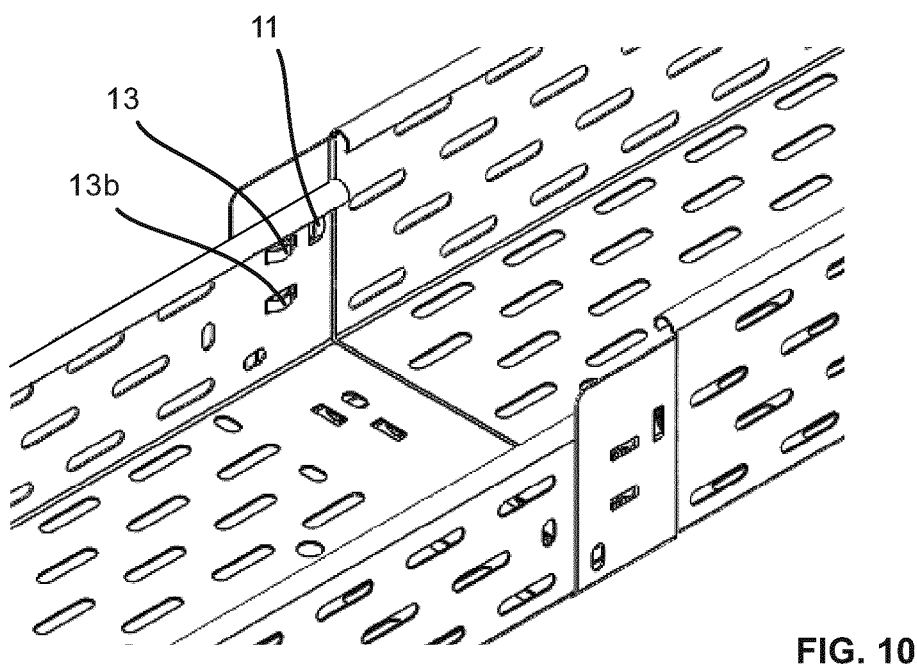
FIG. 10: another embodiment of two connected cable tray segments of different cable tray side cheek heights.

A further embodiment of the cable tray system 1 is shown in FIG. 10. In the case of higher cable tray segments, it can be advantageous to provide not only one horizontally oriented strap-shaped latching element 13, but to arrange further latching elements 13b below the uppermost horizontally oriented strap-shaped latching element 13 as required. In this case, the horizontally oriented latching elements 13 are preferably positioned at the same distance from the end of the cable tray segment to one another, as shown. In order to avoid jamming of the end of one cable tray segment with the lower horizontally oriented strap-shaped latching element 13b when assembling the two cable tray segments during vertical assembly, the vertically oriented latching element 11 is set up in terms of height and/or pitch in such a way that the flank of the lower horizontally oriented strap 13b is overcome by the elastic bending of the cable tray side cheeks towards each other.

Figure 11:
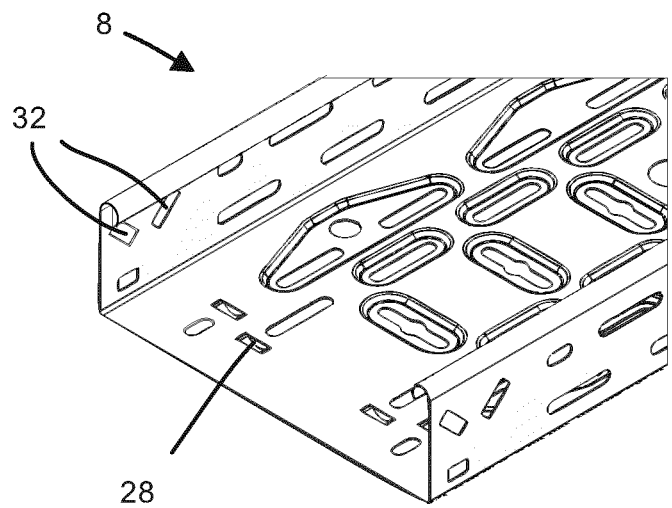
FIG. 11: an end of a further embodiment of a cable tray segment.
Figure 12:
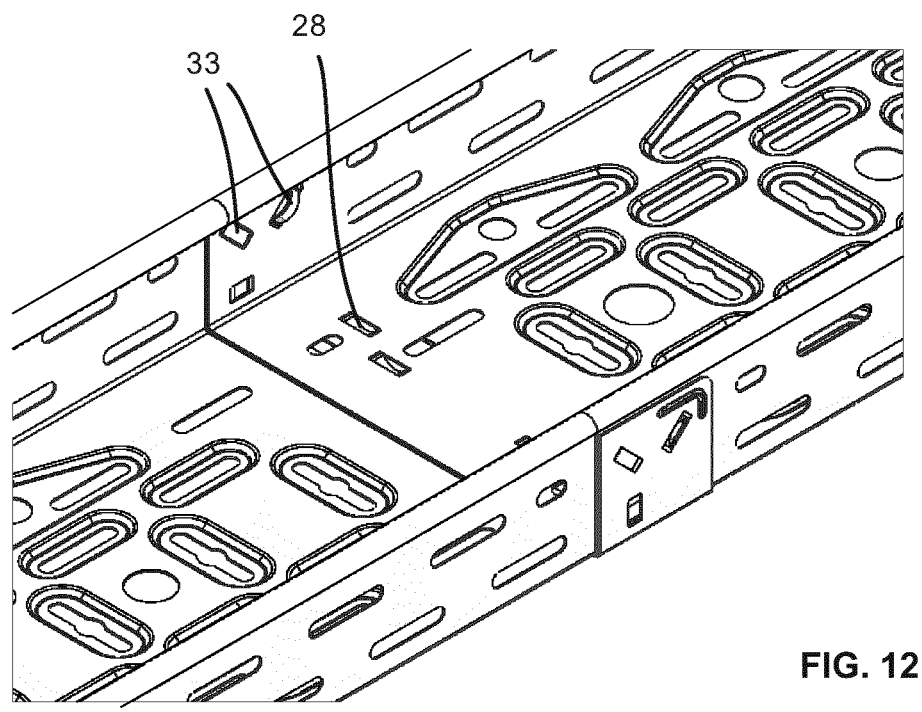
FIG. 12: an embodiment of two connected cable tray segments with angled latching elements.
Figure 13:
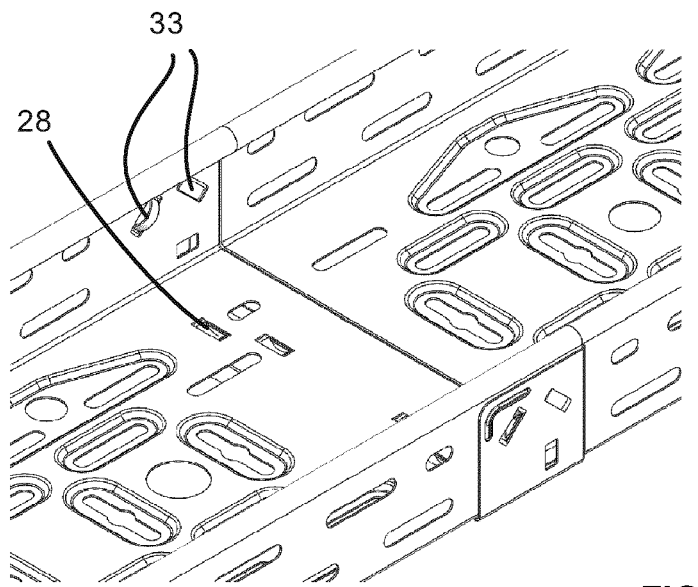
FIG. 13: another embodiment of two connected cable tray segments with angled latching elements.

FIGS. 11 to 13 show a further embodiment of the cable tray system 1 according to the invention. The cable tray segments are again bent from sheet metal, and have various holes and recesses on the cable tray underside and the cable tray side cheeks. Beads are provided on the cable tray underside, in which further holes are provided.

One end of the one cable tray segment again has an offset forming a flared end of the cable tray segment. The unbent end of the cable tray segment shown in FIG. 11 can be inserted into this end, as shown. Strap-shaped latching elements 33 arranged on the cable tray side cheeks and stamped into the sheet metal are again used as complementary mechanical connecting elements. The latching elements 33 on the cable tray side cheeks are angled towards each other in a V-shape. The angle to the vertical is approximately ±45°.

The angle ensures that when two cable tray segments are mounted vertically, the cable tray segment with the corresponding latching holes 32 can be supported on the latching elements 33 at two points, but the cable tray side cheeks are elastically bent towards each other via the ramp-shaped part. The end of the cable tray segment can thus be transferred with the corresponding latching holes 32 via the latching elements 33 into the desired connecting position.

It is also possible to mount such cable tray segments in the longitudinal direction. When mounted in the longitudinal direction, the end to be inserted into the bend area can be supported in the bend area on the one hand and on the front latching elements on the other. Due to the inclined position of the front latching elements, cable tray side cheeks are in turn bent during insertion, so that the two cable tray segments can be pushed into one another in a particularly simple manner.

FIG. 13 shows another possible arrangement of the latching elements on the cable tray side cheeks. These can also be angled in an inverted V-shape.

Figure 14:
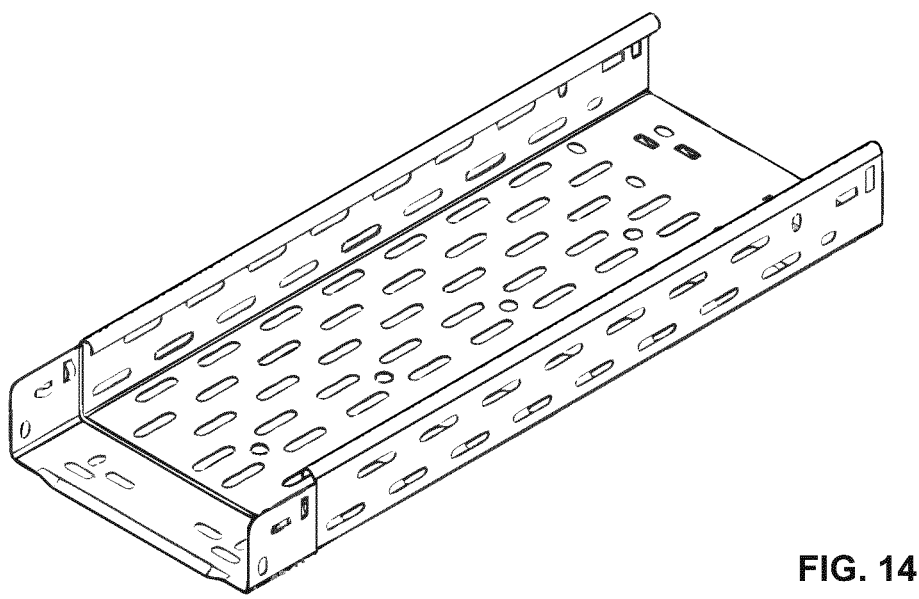
FIG. 14: a possible embodiment of a cable tray segment compatible with the cable tray system.

FIG. 14 shows another possible embodiment of a cable tray segment according to the invention. The ends of the cable tray segment are designed to correspond to each other.

This type of corresponding ends can of course also be applied to other cable tray segments.

The description of the present disclosure is merely exemplary in nature and variations that do not depart from the gist of the present disclosure are intended to be within the scope of the present disclosure. Such variations are not to be regarded as a departure from the spirit and scope of the present disclosure.

LIST OF REFERENCE NUMERALS

1 Cable tray system
2 first cable tray segment
3 second cable tray segment
8 Cable tray segment with higher cable tray side cheeks
10 vertical side strap
12 Zinc drain hole
13 horizontal side strap
13 second horizontal side strap
14 Recess for bending tab on the side
15 Screw hole
16 Widened cable tray end
17 Ramp
18 Latching hole for ground strap
19 Recess for bending plate
20 Screw hole at the bottom
21 Optional screw hole on the side (elongated hole)
25 Bending tab on the side
26 Screw hole at the bottom
27 Bottom bending tab
28 Floor tab
29 vertical latching hole for side strap
30 horizontal latching hole for side strap
32 Angled latching hole for angled side strap
33 angled side strap

The invention claimed is:

1. A Cable tray system comprising:
two or more cable tray segments, the cable tray segments each having a cable tray underside and two cable tray side cheeks laterally delimiting the cable tray underside, and the cable tray segments being designed to be connected to one another in an overlapping manner and, for this purpose, a connecting section being provided at one end of a first cable tray segment;
wherein one end of a second cable tray segment can be connected in or on the connecting section with complementary mechanical connecting elements by means of a clamping or latching connection;
wherein the complementary mechanical connecting elements are set up such that when two corresponding ends of the cable tray segments are plugged together in a longitudinal direction of the cable tray segments and in a vertical direction of the cable tray segments, the ends bend resiliently with respect to one another until a desired connecting position is reached, and in the desired connecting position the complementary mechanical connecting elements form a latching connection which locks in the longitudinal direction and in the vertical direction; and
wherein the complementary connecting elements are arranged on the cable tray side cheeks and are formed from latching elements and corresponding mating receptacles, wherein at least two latching elements per cable tray side cheek are provided at one end of the first cable tray segment and two corresponding mating receptacles per cable tray side cheek are provided at the end to be connected of the second cable tray segment, wherein the latching elements have a ramp-shaped part which, when two cable tray segments are plugged together, effects the resilient bending of the ends of the cable tray segments relative to one another.

2. The Cable tray system according to claim 1, wherein the latching elements are provided in the connecting section of the first cable tray segment.

3. The first Cable tray segment according to the claim 1, wherein in each case at least one of the latching elements is arranged in such a way that the ramp-shaped part points in the longitudinal direction in a direction of the end of the first cable tray segment, and another latching element has a ramp-shaped part which points vertically transversely to the longitudinal direction in the direction of an upper edge of the cable tray side cheeks, the latching elements each being arranged in such a way that the ramp-shaped parts of the latching elements first come into contact with the end of the second cable tray segment during a horizontal and vertical assembly of two cable tray segments.

4. The Cable tray system according to claim 1, wherein the latching elements are formed by strap-shaped latching elements arranged in the cable tray side cheeks.

5. The Cable tray system according to claim 4, wherein the strap-shaped latching elements are arranged at the same height and at an angle to one another.

6. The Cable tray system according to claim 1, wherein connecting tabs, in particular bending tabs, are provided at one end of the two or more cable tray segments on the cable tray underside and/or on the cable tray side cheeks, which tabs can form an additional form fit of the cable tray segments when the two or more cable tray segments are inserted into one another with correspondingly formed openings.

7. The Cable tray system according to claim 1, wherein the connecting section of the first cable tray segment is formed by an offset section, the offset section forming in particular an expanded end of the first cable tray segment in such a way that an unoffset end of the second cable tray segment can be inserted into the offset section for an intended assembly of the two or more cable tray segments.

8. The Cable tray system according to claim 7, wherein a downwardly inclined ramp is provided at the end of the offset section on the underside of the cable tray system.

9. The Cable tray system according to claim 8, wherein latching elements are provided on the cable tray underside of the end of the second cable tray segment corresponding to the first cable tray segment with ramp, and in that a width of the ramp is matched to a transverse extent of the latching elements on the cable tray underside in such a way that the latching elements are located within the width of the ramp when the two or more cable tray segments are plugged together.

10. The Cable tray system according to claim 1, wherein the cable tray system comprises cable tray segments of different heights of cable tray side cheeks and at least the lower latching elements and corresponding mating receptacles are each equally spaced from the cable tray underside.

11. The Cable tray system according to claim 1, wherein in a region of a transition from the connecting section into the two or more cable tray segments, a recess or opening is provided in each case between the cable tray underside and cable tray side cheeks, which recess or opening is set up to receive or remove material removed by pushing the two or more cable tray segments together.

12. The first Cable tray segment for use in a cable tray system according to claim 1, further comprising a cable tray underside and two cable tray side cheeks laterally delimiting the cable tray underside, mechanical connecting elements, in particular strap-shaped latching elements, being provided at one end of the first cable tray segment on the cable tray side cheeks, in particular strap-shaped latching elements are provided at one end of the first cable tray segment on the cable tray side cheeks, which latching elements are set up to bring about elastic bending of the cable tray side cheeks of the other second cable tray segment when two cable tray segments are plugged together, so that the second cable tray segment can be guided into a desired connection position via the connecting elements.

13. The first Cable tray segment according to claim 12, wherein a first end is formed to correspond to the other end.

14. A Cable tray system comprising:
two or more cable tray segments, the two or more cable tray segments each having a cable tray underside and two cable tray side cheeks laterally delimiting the cable tray underside, and the two or more cable tray segments being designed to be connected to one another in an overlapping manner and, for this purpose, a connecting section being provided at one end of a first cable tray segment;
wherein one end of a second cable tray segment can be connected in or on the connecting section with complementary mechanical connecting elements by means of a clamping or latching connection;
wherein the complementary mechanical connecting elements are set up such that when two corresponding ends of the two or more cable tray segments are plugged together in a longitudinal direction of the two or more cable tray segments and in a vertical direction of the two or more cable tray segments, the ends bend resiliently with respect to one another until a desired connecting position is reached, and in the desired connecting position the complementary mechanical connecting elements form a latching connection which locks in the longitudinal direction and in the vertical direction;
wherein the complementary mechanical connecting elements are arranged on the cable tray side cheeks and are formed from latching elements and corresponding mating receptacles, wherein at least two latching elements per cable tray side cheek are provided at one end of the first cable tray segment, preferably in the connecting section of the first cable tray segment, and two corresponding mating receptacles per cable tray side cheek are provided at the end to be connected of the other second cable tray segment; and
wherein connecting tabs, in particular bending tabs, are provided at one end of the second cable tray segment on the cable tray underside and/or on the cable tray side cheeks, which tabs can form an additional form fit of the two or more cable tray segments when the two or more cable tray segments are inserted into one another with correspondingly formed openings.

15. The Cable tray system of claim 14, wherein:
the latching elements are formed by strap-shaped latching elements arranged in the cable tray side cheeks, and the latching elements have a ramp-shaped part which, when the two or more cable tray segments are plugged together, effects the resilient bending of the ends of the two or more cable tray segments relative to one another; and
wherein in each case at least one of the latching elements is arranged in such a way that the ramp-shaped part points in a longitudinal direction in a direction of an end of the first cable tray segment, and another latching element has a ramp-shaped part which points vertically transversely to a longitudinal direction in a direction of an upper edge of the cable tray side cheeks, the latching elements each being arranged in such a way that the ramp-shaped parts of the latching elements first come into contact with the end of the second cable tray segment during a horizontal and vertical assembly of two or more cable tray segments.

16. The Cable tray system of claim 15, wherein:
the connecting section of the first cable tray segment is formed by an offset section, the offset section forming in particular an expanded end of the first cable tray segment in such a way that an un-offset end of the second cable tray segment can be inserted into the offset section for an intended assembly of the two or more cable tray segments;
a downwardly inclined ramp is provided at the end of the offset section on the underside of the cable tray system; and
in a region of a transition from the connecting section into the first cable tray segment, a recess or opening is provided in each case between the cable tray underside and the cable tray side cheeks, which recess or opening is set up to receive or remove material removed by pushing the two or more cable tray segments together.

17. The Cable tray system of claim 16, wherein:
latching elements are provided on the cable tray underside of the end of the second cable tray segment corresponding to the first cable tray segment with ramp, and in that a width of the ramp is matched to a transverse extent of the latching elements on the cable tray underside in such a way that the latching elements are located within the width of the ramp when the two or more cable tray segments are plugged together; and
wherein the cable tray system further comprises cable tray segments of different heights of cable tray side cheeks and at least the lower latching elements and corresponding mating receptacles are each equally spaced from the cable tray underside.

* * * * *